(12) United States Patent
Wang et al.

(10) Patent No.: US 11,958,757 B2
(45) Date of Patent: Apr. 16, 2024

(54) LITHIUM-MANGANESE-RICH MATERIAL, PREPARATION METHOD FOR SAME, AND APPLICATIONS THEREOF

(71) Applicant: Beijing Easpring Material Technology Co., Ltd., Beijing (CN)

(72) Inventors: Jun Wang, Beijing (CN); Yafei Liu, Beijing (CN); Yanbin Chen, Beijing (CN)

(73) Assignee: BEIJING EASPRING MATERIAL TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 17/778,468

(22) PCT Filed: Mar. 3, 2021

(86) PCT No.: PCT/CN2021/078797
§ 371 (c)(1),
(2) Date: May 20, 2022

(87) PCT Pub. No.: WO2021/175233
PCT Pub. Date: Sep. 10, 2021

(65) Prior Publication Data
US 2022/0371911 A1   Nov. 24, 2022

(30) Foreign Application Priority Data

Mar. 3, 2020 (CN) .......................... 202010140946.3
Mar. 30, 2020 (CN) .......................... 202010238007.2

(51) Int. Cl.
*C01G 45/12* (2006.01)
*C01G 53/00* (2006.01)

(52) U.S. Cl.
CPC ......... *C01G 45/1228* (2013.01); *C01G 53/50* (2013.01); *C01P 2006/12* (2013.01)

(58) Field of Classification Search
None
See application file for complete search history.

(56) References Cited

U.S. PATENT DOCUMENTS

| | | | |
|---|---|---|---|
| 2003/0087155 A1* | 5/2003 | Cho | ...................... H01M 4/505 429/231.95 |
| 2013/0146808 A1 | 6/2013 | Endo et al. | |
| 2014/0004423 A1 | 1/2014 | Endo et al. | |

(Continued)

FOREIGN PATENT DOCUMENTS

| | | |
|---|---|---|
| CN | 102683645 A | 9/2012 |
| CN | 103904311 A | 7/2014 |

(Continued)

OTHER PUBLICATIONS

Huang et al., An Improvement of Electrochemical Performance of Li1.2Mn0.54Ni0.13Co0.13O2 by blending with Na0.6[Li0.2Mn0.8] O2, Apr. 2015, Intl. J. Electrochem. Soc., 10, 5048-5060 (Year: 2015).*

(Continued)

*Primary Examiner* — Daniel S Gatewood
(74) *Attorney, Agent, or Firm* — Volpe Koenig

(57) ABSTRACT

The present disclosure relates to the technical field of lithium ion battery, and discloses a Lithium-Manganese-rich material and a preparation method and a use thereof.

14 Claims, 4 Drawing Sheets

(56) References Cited

U.S. PATENT DOCUMENTS

| | | | |
|---|---|---|---|
| 2015/0037678 A1 | 2/2015 | Kwak et al. | |
| 2015/0037878 A1* | 2/2015 | Musser | C05F 17/40 435/290.1 |
| 2018/0351157 A1 | 12/2018 | Kendrick et al. | |

FOREIGN PATENT DOCUMENTS

| | | |
|---|---|---|
| CN | 104134797 A | 11/2014 |
| CN | 104201337 A | 12/2014 |
| CN | 104507866 A | 4/2015 |
| CN | 107834050 A | 3/2018 |
| CN | 109449382 A | 3/2019 |
| CN | 109461928 A | 3/2019 |
| CN | 109524638 A | 3/2019 |
| CN | 109860547 A | 6/2019 |
| CN | 110112410 A | 8/2019 |
| JP | 201429828 A | 2/2014 |
| JP | 2015038830 A | 2/2015 |
| JP | 2017-050217 A | 3/2017 |
| KR | 1020150013078 A | 2/2015 |
| WO | 2012039413 A1 | 3/2012 |
| WO | 2018/024661 A1 | 2/2018 |

OTHER PUBLICATIONS

He Huang et al. "An Improvement of Electrochemical Performance of Li1.2Mn0.54Ni0.13Co0.13O2 by blending with Na0.6[Li0.2Mn0.8]O2" International Journal of Electrochemical Science, vol. 10 No. 6, pp. 5048-5060, Apr. 28, 2015 (Apr. 28, 2015), ISSN: 1452-3981.

An Improvement of Electrochemical Performance of Li1.2Mn0.54Ni0.13Co0.13O2 by blending with Na0.6[Li0.2Mn0.8] O2; H Huang, GB Liu, JH Wu, H Liu—Int. J. Electrochem. Sci, 2015; p. 5048-5060—electrochemsci.org.

Abbireddy, C., "A Review of Modern Particle Sizing Methods," Article, Ice Proceedings Geotechnical Engineering, (2009).

Bardestani, R., "Experimental Methods in Chemical Engineering: Specific Surface Area and Pore Size Distribution Measurements—BET, BJH, and DFT," Article, Canadian Journal of Chemical Engineering, (2019).

Amidon, G., "Tapped Destiny—Particle, Powder, and Compact Characterization," Article, (2017).

Li-Zhen, W., "Synthesis and Properties of Cathode Material," Article, Chinese Journal of Inorganic Chemistry, (2016).

* cited by examiner

US 11,958,757 B2

LITHIUM-MANGANESE-RICH MATERIAL, PREPARATION METHOD FOR SAME, AND APPLICATIONS THEREOF

CROSS REFERENCE TO RELATED APPLICATIONS

This application is a 35 USC § 371 National Stage application of International Patent Application No. PCT/CN2021/078797, which was filed Mar. 3, 2021, entitled "LITHIUM-MANGANESE-RICH MATERIAL, PREPARATION METHOD FOR SAME, AND APPLICATIONS THEREOF" and claims priority to Chinese Patent Application No. 202010140946.3, filed Mar. 3, 2020 and Chinese Patent Application No. 202010238007.2, filed Mar. 30, 2020 which are incorporated herein by reference as if fully set forth.

FIELD

The present disclosure relates to the technical field of lithium ion battery, in particular to a Lithium-Manganese-rich material, a method for preparing the same, the Lithium-Manganese-rich material prepared with the method, and a use of the Lithium-Manganese-rich material in the lithium ion battery.

BACKGROUND

The cathode is used as a key core material of the lithium ion battery, and directly determines the technical performance level of the battery. With the continually stringent demand on the energy density of lithium ion batteries imposed by various application fields, the commercialized cathode materials mainly comprise layered $LiMO_2$ (M refers to Ni, Co, Mn, etc.), spinel type $LiMn_2O_4$ and olivine type $LiFePO_4$. Wherein the $LiCoO_2$ has a high cost; the $LiMn2O_4$ with a spinel structure is prone to generate crystal transformation Jahn-Teller effect and dissolution of manganese ions in the cycling process, such that the battery capacity is quickly attenuated, and the high-temperature performance is poor; the layered positive electrode material $LiNi_{1-x-y}Co_xMn_yO_2$ reduces the material cost and improves the performance due to the synergistic effect of Ni, Co and Mn, but the actual specific capacity lacks a significant breakthrough, it can hardly meets the requirements of users.

The layered Lithium-Manganese-rich material has attracted the extensive attention from the people by virtue of high specific capacity (>250 mAh/g), high safety, low price and other advantages, and becomes a new generation of power lithium ion battery cathode material with the most development potential. However, the material will be transformed from a layered structure to a spinel structure in a cycling process, which causes severe voltage decay, reduces the energy density of the material, and increases the difficulty of a battery management system, thereby seriously hindering the commercial application process of the material.

Therefore, it is significantly important to develop of a lithium-manganese-rich cathode material with high specific capacity, high safety and excellent cycle stability.

SUMMARY

The present disclosure aims to overcome the defects in the prior art that the Lithium-Manganese-rich material is prone to generate structure transformation in the cyclic process and has poor cycle stability.

In order to achieve the above object, a first aspect of the present disclosure provides a Lithium-Manganese-rich material comprising a substrate and a coating layer coated on a surface of the substrate;

the substrate comprises a substance represented by a chemical formula $Li_{1.2+x}[(Mn_aCo_bNi_cM_{1-a-b-c})_{1-d}M'_d]_{0.8-x}O_2$, the coating layer comprises a substance represented by a chemical formula $Na_u[Li_v(Mn_aCo_bNi_cM_{1-a-b-c})_yM'_{1-v-y}]O_2$, wherein $-0.2 \le x \le 0.3$, $0.5 \le a \le 1$, $0 \le b \le 0.5$, $0 \le c \le 0.5$, $0 \le d \le 0.1$, $0.4 \le u < 5/6$, $0 \le v \le 0.5$, $0.5 \le y \le 1$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;

the coating layer in the Lithium-Manganese-rich material has a thickness of 10-100 nm.

A second aspect of the present disclosure provides a method of preparing a Lithium-Manganese-rich material comprising the following steps:

sintering a lithium-manganese-rich precursor material and ingredients in the component A to obtain a Lithium-Manganese-rich material, wherein the component A comprises a lithium salt and a sodium salt, and optionally further comprises a first dopant containing an element M';

wherein the lithium-manganese-rich precursor material is at least one substance selected from the substances represented by the chemical formulas $Mn_aCo_bNi_cM_{1-a-b-c}(OH)_2$ and $Mn_aCo_bNi_cM_{1-a-b-c}CO_3$;

wherein $0.5 \le a \le 1$, $0 \le b \le 0.5$, $0 \le c \le 0.5$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;

a molar ratio of the used amount of the first dopant to the sum of the used amounts of the lithium-manganese-rich precursor material and the first dopant is 0-0.1:1; a molar ratio of the used amount of the lithium salt to the sum of the used amounts of the lithium-manganese-rich precursor material and the first dopant is 1.0-1.6:1, a molar ratio of the used amount of the sodium salt to the used amount of the lithium salt is 0.005-0.3:1; the used amount of the first dopant is calculated in terms of M' element contained therein, the used amount of the lithium-manganese-rich precursor material is calculated in terms of a sum of Mn, Co, Ni, M element contained therein, the used amount of the lithium salt is calculated in terms of Li element contained therein, and the used amount of the sodium salt is calculated in terms of Na element contained therein.

A third aspect of the present disclosure provides a Lithium-Manganese-rich material prepared with the method of the aforesaid second aspect.

A fourth aspect of the present disclosure provides a use of the Lithium-Manganese-rich material of the aforesaid first aspect or third aspect in a lithium ion battery.

Compared with the prior art, the technical solutions provided by the present disclosure at least exhibits the following advantages:

1. The Lithium-Manganese-rich material provided by the present disclosure has excellent cycle stability, small voltage decay and stable structure in the electrochemical cycle process.

2. The Lithium-Manganese-rich material provided by the present disclosure has higher discharge specific capacity, high initial coulombic efficiency and excellent rate capability.

3. The Lithium-Manganese-rich material provided by the present disclosure has the advantages of small specific surface area and high tap density, which are conducive to reducing side reaction with the electrolyte and improving the volume energy density of said battery.

4. The preparation method provided by the present disclosure has the advantages such as simple process, no pollution, simple introduction mode of the doping elements and the coating layer, controllable process and suitability for industrial production.

The additional features and advantages of the present disclosure will be described below in the DETAILED DESCRIPTION.

DETAILED DESCRIPTION

Figure 1:
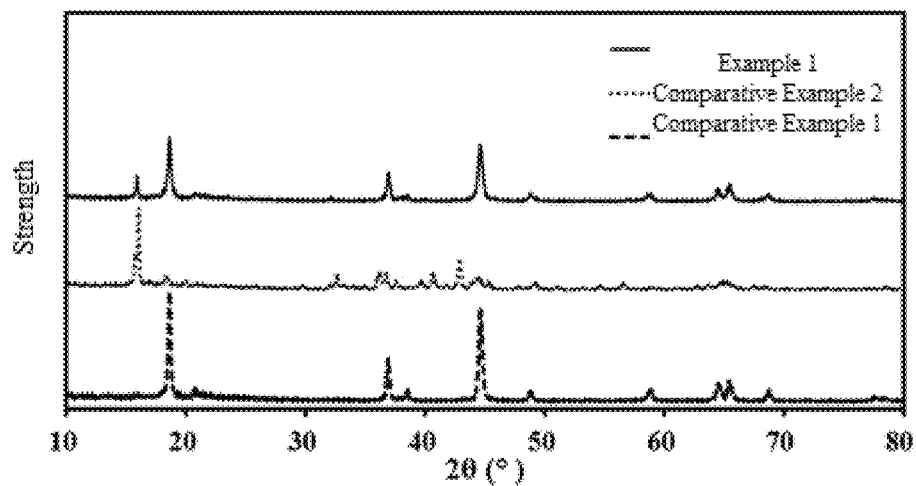
FIG. 1 illustrates a graph showing the X-Ray Diffraction (XRD) test results of the materials prepared in Example 1 and Comparative Examples 1-2.

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

Unless otherwise specified in the present disclosure, the room temperature refers to 25±2° C.

As previously mentioned, a first aspect of the present disclosure provides a Lithium-Manganese-rich material comprising a substrate and a coating layer coated on a surface of the substrate;

the substrate comprises a substance represented by a chemical formula $Li_{1.2+x}[(Mn_aCo_bNi_cM_{1-a-b-c})_{1-d}M'_d]_{0.8-x}O_2$, the coating layer comprises a substance represented by a chemical formula $Na_u[Li_v(Mn_aCo_bNi_cM_{1-a-b-c})_\gamma M'_{1-v-\gamma}]O_2$, wherein $-0.2 \le x \le 0.3$, $0.5 \le a \le 1$, $0 \le b \le 0.5$, $0 \le c \le 0.5$, $0 \le d \le 0.1$, $0.4 \le u < 5/6$, $0 \le v \le 0.5$, $0.5 \le \gamma \le 1$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;

the coating layer in the Lithium-Manganese-rich material has a thickness of 10-100 nm.

In the present disclosure, the substrate comprises a substance having an O3 type structure represented by a chemical formula $Li_{1.2+x}[(Mn_aCo_bNi_cM_{1-a-b-c})_{1-d}M'_d]_{0.8-x}O_2$.

In the present disclosure, the coating layer comprises a substance having a P2 type structural represented by a chemical formula $Na_u[Li_v(Mn_aCo_bNi_cM_{1-a-b-c})_\gamma M'_{1-v-\gamma}]O_2$.

In the present disclosure, the coating comprises the coating layer attached to a surface of the substrate.

Preferably, the Lithium-Manganese-rich material has a median particle diameter $D_{50}$ of 5-15 μm.

Preferably, a specific surface area of the Lithium-Manganese-rich material is 0.2-8 m²/g, and a tap density of the Lithium-Manganese-rich material is 1.4-2.0 g/cm³.

As previously mentioned, a second aspect of the present disclosure provides a method of preparing a Lithium-Manganese-rich material comprising the following steps:

sintering a lithium-manganese-rich precursor material and ingredients in the component A to obtain a Lithium-Manganese-rich material, wherein the component A comprises a lithium salt and a sodium salt, and optionally further comprises a first dopant containing an element M';

wherein the lithium-manganese-rich precursor material is at least one substance selected from the substances represented by the chemical formulas $Mn_aCo_bNi_cM_{1-a-b-c}(OH)_2$ and $Mn_aCo_bNi_cM_{1-a-b-c}CO_3$;

wherein $0.5 \le a \le 1$, $0 \le b \le 0.5$, $0 \le c \le 0.5$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;

a molar ratio of the used amount of the first dopant to the sum of the used amounts of the lithium-manganese-rich precursor material and the first dopant is 0-0.1:1; a molar ratio of the used amount of the lithium salt to the sum of the used amounts of the lithium-manganese-rich precursor material and the first dopant is 1.0-1.6:1, a molar ratio of the used amount of the sodium salt to the used amount of the lithium salt is 0.005-0.3:1; the used amount of the first dopant is calculated in terms of M' element contained therein, the used amount of the lithium-manganese-rich precursor material is calculated in terms of a sum of Mn, Co, Ni, M element contained therein, the used amount of the lithium salt is calculated in terms of Li element contained therein, and the used amount of the sodium salt is calculated in terms of Na element contained therein.

In the method according to the second aspect of the present disclosure, a molar ratio of the used amount of the first dopant to the sum of the used amounts of the lithium-manganese-rich precursor material and the first dopant is 0-0.1:1, it means that the molar ratio of the used amount of the first dopant calculated in terms of the M' element contained therein to the sum of the used amounts of the lithium-manganese-rich precursor material calculated in terms of the sum of Mn, Co, Ni, M elements contained therein and the first dopant calculated in terms of the M' element contained therein is 0-0.1:1, that is, M'/(Ni+Co+Mn+M+M')=0-0.1:1.

In the method according to the second aspect of the present disclosure, a molar ratio of the used amount of the lithium salt to the sum of the used amounts of the lithium-manganese-rich precursor material and the first dopant is 1.0-1.6:1, it means that a molar ratio of the used amount of the lithium salt calculated in terms of Li element contained therein to the sum of the used amounts of the lithium-manganese-rich precursor material calculated in terms of the sum of Mn, Co, Ni, M element contained therein and the first dopant calculated in terms of M' element contained therein is 1.0-1.6:1, that is, Li/(Ni+Co+Mn+M+M')=1.0-1.6:1.

In the method according to the second aspect of the present disclosure, a molar ratio of the used amount of the sodium salt to the used amount of the lithium salt is 0.005-0.3:1, it means that the molar ratio of the used amount of the sodium salt calculated in terms of sodium element contained therein to the used amount of the lithium salt calculated in terms of lithium element contained therein is 0.005-0.3:1, that is, Na/Li=0.005-0.3:1.

In the method according to the second aspect of the present disclosure, the lithium salt, the sodium salt, the first dopant and the lithium-manganese-rich precursor material are used in amounts such that the produced Lithium-Manganese-rich material has the characteristics of the Lithium-Manganese-rich material according to the aforesaid first aspect.

Preferably, according to the method of the second aspect of the present disclosure, the sintering conditions comprise: the sintering is performed in an oxygen-containing atmosphere or a nitrogen atmosphere, the temperature is raised from room temperature to 300-600° C., the heat preservation is performed for 0-6 h to carry out a first sintering, the temperature is subsequently further raised to 650-1,000° C., the heat preservation is performed for 4-20 h to carry out a second sintering.

According to the method of the second aspect of the present disclosure, when the heat preservation time of the first sintering is 0 h, i.e., without the first sintering process, the temperature is directly raised from room temperature to 650-1,000° C. to carry out the second sintering.

Preferably, the lithium salt is at least one selected from the group consisting of lithium carbonate, lithium hydroxide, lithium chloride, lithium nitrate and lithium sulfate.

Preferably, the sodium salt is at least one selected from the group consisting of sodium carbonate, sodium bicarbonate, sodium oxalate, sodium acetate, sodium citrate, sodium chloride, sodium nitrate, sodium sulfate and sodium hydroxide.

Preferably, the first dopant is at least one selected from the group consisting of an oxide containing the element M', a phosphate containing the element M', a fluoride containing the element M' and a carbonate containing the element M'.

According to a preferred embodiment of the present disclosure, the method further comprises preparing the lithium-manganese-rich precursor material with the following steps:

subjecting the ingredients in the component B to a coprecipitation reaction in the presence of a solvent, so as to obtain the lithium-manganese-rich precursor material, wherein the component B comprises a manganese salt, a precipitant and a complexing agent, and optionally further comprises at least one of a nickel salt, a cobalt salt and a second dopant, wherein the second dopant includes an element M.

Wherein the manganese salt, the precipitant, the complexing agent, the nickel salt, the cobalt salt and the second dopant are used in amounts such that the obtained lithium-manganese-rich precursor material is selected from at least one substance represented by chemical formulas $Mn_aCo_bNi_cM_{1-a-b-c}(OH)_2$ and $Mn_aCo_bNi_cM_{1-a-b-c}CO_3$, wherein $0.5 \leq a \leq 1$, $0 \leq b \leq 0.5$, $0 \leq c \leq 0.5$.

Preferably, a molar ratio of the used amount of the second dopant in terms of the M element contained therein to the sum of the used amounts of the nickel salt calculated in terms of the Ni element contained therein, the manganese salt calculated in terms of the Mn element contained therein, and the cobalt salt calculated in terms of the Co element contained therein is 0-0.1:1, that is, M/(Ni+Co+Mn)=0-0.1:1.

Preferably, the precipitant is at least one selected from the group consisting of sodium hydroxide, potassium hydroxide, sodium carbonate and potassium carbonate. When the precipitant is sodium hydroxide and/or potassium hydroxide, the lithium-manganese-rich precursor material is selected from at least one substance represented by a chemical formula $Mn_aCo_bNi_cM_{1-a-b-c}(OH)_2$; when the precipitant is sodium carbonate and/or potassium carbonate, the lithium-manganese-rich precursor material is selected from at least one substance represented by a chemical formula $Mn_aCo_bNi_cM_{1-a-b-c}CO_3$.

Preferably, the complexing agent is at least one selected from the group consisting of ammonia water, salicylic acid, ammonium sulfate and ammonium chloride.

Preferably, the concentration of the complexing agent is 2-10 mol/L.

Preferably, the concentration of the precipitant is 4-10 mol/L.

In the present disclosure, the used amounts of the complexing agent and the precipitant cause that the reaction system has a pH of 7-12.

Preferably, the second dopant is at least one selected from the group consisting of an oxide containing the element M, a phosphate containing the element M, a fluoride containing the element M and a carbonate containing the element M.

Preferably, the manganese salt, the cobalt salt, and the nickel salt are respectively and independently at least one selected from the group consisting of a sulfate, a nitrate, a chloride, an acetate and a citrate thereof, for example, the manganese salt is at least one selected from the group consisting of manganese sulfate, manganese nitrate, manganese chloride, manganese acetate and manganese citrate; the cobalt salt is at least one selected from the group consisting of cobalt sulfate, cobalt nitrate, cobalt chloride, cobalt acetate and cobalt citrate; the nickel salt is at least one selected from the group consisting of nickel sulfate, nickel nitrate, nickel chloride, nickel acetate and nickel citrate.

Preferably, the coprecipitation reaction conditions comprise: the reaction is carried out in a reaction kettle at the temperature of 20-60° C., a pH value of 7-12, a stirring rotation speed of 300-1,000 rpm for the reaction time of 10-30 h.

A more preferred embodiment is provided below to illustrate the preparation of the lithium-manganese-rich precursor material in the present disclosure:

dissolving manganese salt and at least one of the optionally existing nickel salt, cobalt salt, and a second dopant containing an element M to obtain a mixed salt solution with a concentration of 1-3 mol/L, dissolving a precipitant to obtain a precipitant solution with a concentration of 4-10 mol/L, dissolving a complexing agent to obtain a complexing agent solution with a concentration of 2-10 mol/L, and adding the precipitant solution, the complexing agent solution and the mixed salt solution into a reaction kettle in a concurrent flow manner to carry out a coprecipitation reaction, wherein the coprecipitation reaction conditions comprise: the reaction is carried out in a reaction kettle at the temperature of 20-60° C., a pH value of 7-12, a stirring rotation speed of 300-1,000 rpm for the reaction time of 10-30 h, so as to obtain the lithium-manganese-rich precursor material.

According to another preferred embodiment of the present disclosure, the method according to the second aspect of the present disclosure comprising:

(1) subjecting the ingredients of compound B to a coprecipitation reaction in the presence of a solvent, so as to obtain a lithium-manganese-rich precursor material; wherein the component B comprises a manganese salt, a precipitant and a complexing agent, and optionally at least one selected from the group consisting of a nickel salt, a cobalt salt and a second dopant, the second dopant comprises an element M, the coprecipitation reaction conditions comprise: the temperature of 20-60° C., a pH value of 7-10, a stirring rotation speed of 300-1,000 rpm for the reaction time of 10-30 h;

(2) sintering the lithium-manganese-rich precursor material obtained in the step (1) and ingredients of the component A to obtain a Lithium-Manganese-rich material, wherein the component A comprises a lithium salt and a sodium salt, and the component A optionally further comprises a first dopant containing an element M, the sintering conditions comprise: the sintering is performed in an oxygen-containing atmosphere or a nitrogen atmosphere, the temperature is raised from room temperature to 300-600° C., the heat preservation is performed for 0-6 h to carry out a first sintering, the temperature is subsequently further raised to 650-1,000° C., the heat preservation is performed for 4-20 h to carry out a second sintering.

The method according to a second aspect of the present disclosure further comprises a post-treatment means generally known in the art, such as suction filtration, washing, drying, crushing and sieving, the present disclosure will not give unnecessary details herein, the content shall not construed by those skilled in the art as limitation to the present disclosure.

As previously mentioned, a third aspect of the present disclosure provides a Lithium-Manganese-rich material prepared with the method of the second aspect.

Preferably, the Lithium-Manganese-rich material comprises a substrate and a coating layer coated on a surface of the substrate, the substrate comprises a substance represented by a chemical formula $Li_{1.2+x}[(Mn_aCo_bNi_cM_{1-a-b-c})_{1-d}M'_d]_{0.8-x}O_2$, the coating layer comprises a substance represented by a chemical formula $Na_u[Li_v(Mn_a Co_bNi_cM_{1-a-b-c})_\gamma M'_{1-v-\gamma}]O_2$, wherein $-0.2 \le x \le 0.3$, $0.5 \le a \le 1$, $0 \le b \le 0.5$, $0 \le c \le 0.5$, $0 \le d \le 0.1$, $0.4 \le u < 5/6$, $0 \le v \le 0.5$, $0.5 \le \gamma \le 1$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr.

Preferably, the coating layer in the Lithium-Manganese-rich material has a thickness of 10-100 nm.

Preferably, the Lithium-Manganese-rich material has a median particle diameter $D_{50}$ of 5-15 μm.

Preferably, a specific surface area of the Lithium-Manganese-rich material is 0.2-8 $m^2/g$, and a tap density of the Lithium-Manganese-rich material is 1.4-2.0 $g/cm^3$.

In the present disclosure, the capacity of the coating layer is extremely low (approximately zero), but the inventor unexpectedly finds that the Lithium-Manganese-rich material obtained by generating the coating layer on the surface of the substrate substance in situ not only has excellent rate capability and cycle stability, but also has excellent discharge specific capacity.

As previously mentioned, a fourth aspect of the present disclosure provides a use of a Lithium-Manganese-rich material according to the first aspect or the third aspect in a lithium ion battery.

The present disclosure will be described below in detail with reference to examples.

Unless otherwise specified, all the raw materials in the following examples are commercially available.

In the following examples, the associated properties were obtained in the following manner:

(1) phase test: measured with an X-ray diffractometer with a model SmartLab 9 kw manufactured by the Rigaku Corporation in Japan;

(2) morphology test: measured with a scanning electron microscope with a model S-4800 manufactured by the Hitachi corporation in Japan;

(3) median particle diameter $D_{50}$: measured with a laser particle analyzer with a model Hydro 2000 mu manufactured by the Marvern company;

(4) specific surface area: measured with a specific surface tester with a model Tristar II3020 manufactured by the Micromeritics Instrument Corporation in the Unites States of America (USA);

(5) tap density: measured with a tap density tester with a model BT-30 manufactured by the Baxter company;

(6) electrochemical performance testing:

the electrochemical performance of the Lithium-Manganese-rich material prepared below were obtained by a testing of the 2025 type button cell, in particular:

6.1 the preparation process of the 2025 type button cell comprises the following steps:

preparation of a pole piece: the Lithium-Manganese-rich material, carbon black and polyvinylidene fluoride in a mass ratio of 80:10:10 were mixed with a proper amount of N-methylpyrrolidone fully to form a uniform slurry, which was coated on an aluminum foil, the aluminum foil was subjected to drying at 120° C., rolling, and punching shear, such that a positive pole piece with a diameter of 11 mm was manufactured, the load amount of the Lithium-Manganese-rich material was about 7 $mg/cm^2$.

Battery assembly: a 2025 type button cell was assembled in a glove box filled with argon gas, using a lithium sheet as the negative electrode, a polypropylene microporous membrane as the membrane separator (Celgard 2400), and 1M of $LiPF_6$/EC+DMC as the electrolyte.

6.2 Electrochemical performance test:

the 2025 type button cell was subjected to an electrochemical performance test by using the Neware Cell Test System at 25° C., wherein the charge-discharge current density of 1 C was 250 mA/g:

a. the prepared button cell was subjected to a charge-discharge test at 2.0-4.6V and 0.1 C, the first charge-discharge specific capacity and the initial coulombic efficiency of the material were evaluated;

b. the prepared button cell was subjected to 100 charge-discharge cycles at 2.0-4.6V and 0.2 C, the cycle stability and the voltage drop of the material were evaluated;

c. the prepared button cell was subjected to charge-discharge tests at 2.0-4.6V and 0.1 C, 0.2 C, 0.5 C and 1 C respectively, the rate capability of the material was evaluated.

Example 1

(1) Manganese sulfate, nickel sulfate and cobalt sulfate were dissolved according to a molar ratio 4:1:1 in terms of element manganese, cobalt and nickel to obtain a mixed salt solution with a concentration of 2 mol/L, sodium carbonate was dissolved into a precipitant solution with a concentration of 2 mol/L; ammonia water was diluted into a complexing agent solution with a concentration of 3 mol/L. The precipitant solution, the complexing agent solution and 100 L of the mixed salt solution were added into a reaction kettle in a concurrent manner, reaction was performed for 20 h at a temperature of 45° C., a pH of 8.5 and a stirring rotation speed of 700 rpm, a slurry was then subjected to suction filtration and washing, a filter cake was subjected to drying at a temperature of 105° C. and sieving so as to obtain a lithium-manganese-rich precursor material;

(2) the lithium carbonate, sodium carbonate and the lithium-manganese-rich precursor material prepared in step (1) were uniformly mixed, and the temperature was raised from room temperature to 450° C. in an air atmosphere, the heat preservation was performed for 4 h to carry out a first sintering, the temperature was further raised to 850° C., the heat preservation was performed for 10 h to carry out a second sintering, the product was subjected to a natural cooling, crushing and sieving to obtain the Lithium-Manganese-rich material S1.

In the Lithium-Manganese-rich material S1, a molar ratio of the used amount of lithium carbonate calculated in terms of the element Li contained therein to the used amount of Lithium-Manganese-rich material precursor calculated in terms of the sum of element Ni, Co, Mn contained therein was Li/(Ni+Co+Mn)=1.2:1, a molar ratio of the used amount of the sodium carbonate calculated in terms of the element Na contained therein to the used amount of the lithium carbonate calculated in terms of the element Li contained therein was Na/Li=0.075:1.

Examples 2-7

The Lithium-Manganese-rich materials were prepared with a method similar to that in Example 1, except that the different formulas or process parameters were adopted in the preparation method, the rest was the same as that in Example 1, the Lithium-Manganese-rich materials S2-S7 were prepared, the specific formulas and process parameters were shown in Table 1.

TABLE 1

|  | Example 1 | Example 2 | Example 3 | Example 4 | Example 5 | Example 6 | Example 7 |
| --- | --- | --- | --- | --- | --- | --- | --- |
| Preparation process of the precursor | | | | | | | |
| Types of mixed salts | manganese sulfate, nickel sulfate, cobalt sulfate | manganese sulfate, cobalt sulfate | manganese sulfate, nickel sulfate, cobalt sulfate | manganese chloride, nickel chloride | manganese sulfate, nickel sulfate, cobalt sulfate | manganese sulfate, nickel sulfate, cobalt sulfate | manganese sulfate, nickel sulfate, cobalt sulfate |
| Ratio of mixed salt | 4:1:1 | 3:1 | 13:5:2 | 2:1 | 4:1:1 | 4:1:1 | 4:1:1 |
| Concentration of mixed salt | 2 mol/L | 1 mol/L | 3 mol/L | 2 mol/L | 2 mol/L | 3 mol/L | 3 mol/L |
| Precipitant | Sodium carbonate | Potassium carbonate | Sodium carbonate | Sodium hydroxide | Sodium carbonate | Potassium carbonate | Potassium hydroxide |
| Concentration of precipitant | 4 mol/L | 6 mol/L | 5 mol/L | 10 mol/L | 4 mol/L | 4 mol/L | 4 mol/L |
| Complexing agent | Ammonia water | Ammonia water | Ammonia water | Ammonia water | Ammonia water | Ammonia water | Ammonia water |
| concentration of complexing agent | 5 mol/L | 2 mol/L | 10 mol/L | 4 mol/L | 5 mol/L | 2 mol/L | 2 mol/L |
| Types of the second dopant | / | / | Aluminum chloride | Strontium nitrate | Magnesium sulfate | Chromium chloride | Zinc sulfate |
| Ratio of element M | / | / | / | / | / | / | / |
| Amount of element M | / | / | Al/(Ni + Co + Mn) = 0.1:1 | Sr/(Ni + Mn) = 0.02:1 | Mg/(Ni + Co + Mn) = 0.05:1 | Cr/(Co + Ni + Mn) = 0.05:1 | Zn/(Co + Ni + Mn) = 0.02:1 |
| Coprecipitation reaction conditions | | | | | | | |
| Reaction temperature | 45° C. | 60° C. | 20° C. | 50° C. | 45° C. | 30° C. | 25° C. |
| Reaction time | 20 h | 10 h | 30 h | 10 h | 15 h | 20 h | 10 h |
| Rotation speed | 700 rpm | 300 rpm | 1000 rpm | 700 rpm | 700 rpm | 500 rpm | 1000 rpm |
| pH | 8.5 | 9 | 10 | 12 | 8.5 | 8.5 | 10 |
| Preparation process of lithium-manganese-rich material | | | | | | | |
| Types of lithium salt | Lithium carbonate | Lithium carbonate | Lithium carbonate | Lithium hydroxide | Lithium chloride, lithium nitrate | Lithium carbonate | Lithium hydroxide |
| Ratio of lithium salt | / | / | / | / | 4:1 | / | / |
| Used amount of lithium salt | Li/(Ni + Co + Mn) = 1.2:1 | Li/(Co + Mn) = 1.6:1 | Li/(Ni + Co + Mn + Al + Ti) = 1.4:1 | Li/(Ni + Mn + Sr + Zr + Nb) = 1:1 | Li/(Ni + Mn + Co + Mg + La + W) = 1.5:1 | Li/(Ni + Mn + Co + Cr + Pr) = 1.3:1 | Li/(Ni + Mn + Co + Zn + Sc) = 1.5:1 |
| Types of sodium salt | Sodium carbonate | Sodium hydroxide | Sodium bicarbonate | Sodium chloride, sodium hydroxide | Sodium nitrate, sodium bicarbonate | Sodium carbonate | Sodium bicarbonate |

TABLE 1-continued

|  | Example 1 | Example 2 | Example 3 | Example 4 | Example 5 | Example 6 | Example 7 |
|---|---|---|---|---|---|---|---|
| Ratio of sodium salt | / | / | / | 1:1 | 1:1 | / | / |
| Used amount of sodium salt | Na/Li = 0.075 | Na/Li = 0.005 | Na/Li = 0.15 | Na/Li = 0.3 | Na/Li = 0.1 | Na/Li = 0.1 | Na/Li = 0.05 |
| First dopant | / | / | Titanium dioxide | Zirconium dioxide, niobium pentoxide | Lanthanum oxide, tungsten trioxide | Praseodymium oxide | Scandium oxide |
| Ratio of M' | / | / | / | 2:1 | 1:1 | / | / |
| Used amount of M' | / | / | Ti/(Ni + Co + Mn + Al + Ti) = 0.05:1 | Zr/(Ni + Mn + Sr + Zr + Nb) = 0.02:1<br>Nb/(Ni + Mn + Sr + Zr + Nb) = 0.01:1 | La/(Ni + Mn + Co + Mg + La + W) = 0.01:1<br>W/(Ni + Mn + Co + Mg + La + W) = 0.01:1 | Pr/(Ni + Mn + Co + Cr + Pr) = 0.005:1 | Sc/(Ni + Mn + Co + Zn + Sc) = 0.01:1 |
| Sintering conditions | | | | | | | |
| Sintering atmosphere | Air | Air | Oxygen gas | Air | Air | Nitrogen gas | Air |
| First sintering | | | | | | | |
| Temperature | 450° C. | 300° C. | 400° C. | 600° C. | 500° C. | 450° C. | 400° C. |
| Time | 4 h | 6 h | 2 h | 0 h | 4 h | 4 h | 4 h |
| Second sintering | | | | | | | |
| Temperature | 850° C. | 900° C. | 650° C. | 800° C. | 900° C. | 1000° C. | 850° C. |
| Time | 10 h | 8 h | 20 h | 10 h | 10 h | 4 h | 10 h |

Unless otherwise specified, each of the ratios and the used amount ratios in Table 1 refers to a molar ratio.

Comparative Example 1

The preparation was performed with a similar method as that in Example 1, except that the sodium salt was not added in step (2), a molar ratio of the used amount of lithium carbonate calculated in terms of the element Li contained therein to the used amounts of lithium-manganese-rich precursor material calculated in terms of the sum of the elements Ni, Co, Mn contained therein was Li/(Ni+Co+Mn)=1.5:1, a substrate material D1 was prepared.

Comparative Example 2

The preparation was performed with a similar method as that in Example 1, except that in step (2), the added amounts of lithium salt and sodium salt were different, specifically: a molar ratio of the used amount of lithium carbonate calculated in terms of the element Li contained therein to the used amount of Lithium-Manganese-rich material precursor calculated in terms of the sum of the elements Ni, Co and Mn contained therein was Li/(Ni+Co+Mn)=1:3; a molar ratio of the used amount of sodium carbonate calculated in terms of the element Na contained therein to the used amount of lithium carbonate calculated in terms of the element Li contained therein was Na/Li=10:3.

The coating material D2 was prepared.

Comparative Example 3

The preparation was performed with a similar method as that in Example 1, except that in step (2), the added amounts of lithium salt and sodium salt were different, specifically: a molar ratio of the used amount of lithium carbonate calculated in terms of the element Li contained therein to the used amount of Lithium-Manganese-rich material precursor calculated in terms of the sum of the elements Ni, Co and Mn contained therein was Li/(Ni+Co+Mn)=1:1; a molar ratio of the used amount of sodium carbonate calculated in terms of the element Na contained therein to the used amount of lithium carbonate calculated in terms of the element Li contained therein was Na/Li=0.4:1.

A Lithium-Manganese-rich material D3 with a coating thickness of approximately 185 nm was prepared.

Comparative Example 4

S1: the preparation was performed with a similar method as that in Example 1, except that the sodium salt was not added in step (2) of Example 1, a molar ratio of the used amount of lithium carbonate calculated in terms of the element Li contained therein to the used amounts of lithium-manganese-rich precursor material calculated in terms of the sum of the elements Ni, Co, Mn contained therein was Li/(Ni+Co+Mn)=1.5:1, a substrate material D1 was prepared.

S2: the preparation was performed with a similar method as that in Example 1, except that in step (2) of Example 1, the added amounts of lithium salt and sodium salt were different, specifically: a molar ratio of the used amount of lithium carbonate calculated in terms of the element Li contained therein to the used amount of Lithium-Manganese-rich material precursor calculated in terms of the sum of the elements Ni, Co and Mn contained therein was Li/(Ni+Co+Mn)=1:3; a molar ratio of the used amount of sodium carbonate calculated in terms of the element Na contained therein to the used amount of lithium carbonate calculated in terms of the element Li contained therein was Na/Li=10:3, the coating material D2 was prepared.

S3: the coating material D2 prepared in S2 was subjected to ball-milling for 5 h, and then uniformly mixed with the substrate material D1 prepared in S1 according to a weight ratio of 1:10, the temperature was raised from room temperature to 450° C. in an air atmosphere, the heat preservation was performed for 4 h to carry out a first sintering, the temperature was further raised to 850° C., the heat preservation was performed for 10 h to carry out a second sintering, the product was subjected to a natural cooling, crushing and sieving to obtain the Lithium-Manganese-rich material D4 prepared by direct mixing and sintering.

A Lithium-Manganese-rich material D4 with a coating thickness of approximately 370 nm was prepared.

Comparative Example 5

The preparation was performed with a similar method as that in Example 1, except that in step (2), the added amounts of lithium salt and sodium salt were different, specifically: a molar ratio of the used amount of lithium carbonate calculated in terms of the element Li contained therein to the used amount of Lithium-Manganese-rich material precursor calculated in terms of the sum of the elements Ni, Co and Mn contained therein was Li/(Ni+Co+Mn)=1.6:1; a molar ratio of the used amount of sodium carbonate calculated in terms of the element Na contained therein to the used amount of lithium carbonate calculated in terms of the element Li contained therein was Na/Li=0.075:1.

A Lithium-Manganese-rich material D5 with a coating thickness of approximately 50 nm was prepared.

The compositions of the materials prepared in the above Examples were shown in Table 2.

Test Example (1) XRD test

The present disclosure tested XRD of the Lithium-Manganese-rich materials prepared in the above-mentioned Examples, and exemplarily provided XRD test results of Example 1 and Comparative Examples 1-2, as shown in FIG. 1, the Lithium-Manganese-rich material provided by the present disclosure was a composite biphasic structure consisting of an O3 type substrate material of and a P2 type coating material.

(2) Morphology Test

Figure 2:
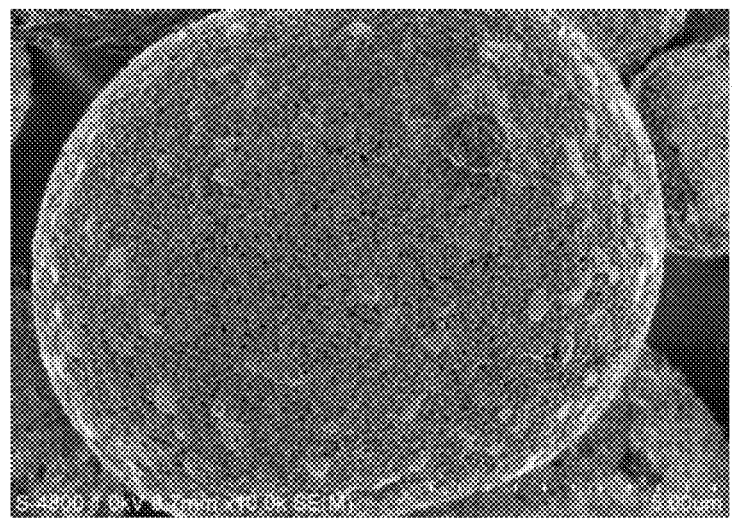
FIG. 2 illustrates a Scanning Electron Microscope (SEM) photograph of the Lithium-Manganese-rich material prepared in Example 1.
Figure 3:
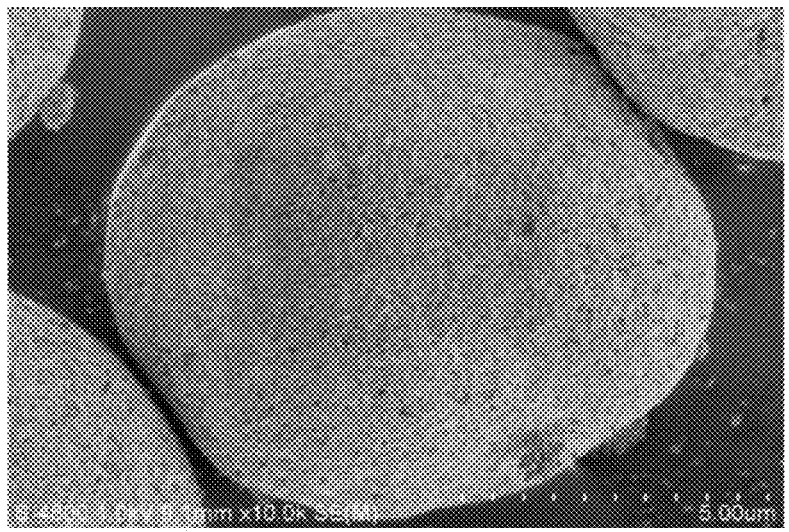
FIG. 3 illustrates a Scanning Electron Microscope (SEM) photograph of a substrate substance prepared in Comparative Example 1.
Figure 4:
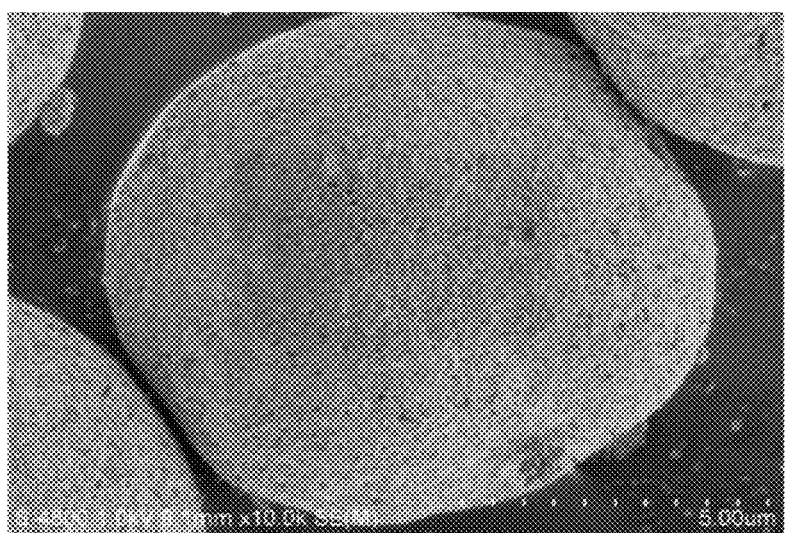
FIG. 4 illustrates a Scanning Electron Microscope (SEM) photograph of a coating layer substance prepared in Comparative Example 2.

The present disclosure tested the scanning electron microscope (SEM) images of the Lithium-Manganese-rich material prepared in the above-mentioned examples, and exemplarily provided SEM images of Example 1 and Comparative Examples 1-2, the results were respectively shown in FIG. 2, FIG. 3 and FIG. 4, as shown in FIG. 2 that the Lithium-Manganese-rich material provided by the present disclosure, the coating material successfully coated the substrate material; as shown in FIG. 3 that the substrate substance was a secondary spherical structure formed by primary particles; as shown in FIG. 4 that the coating substance was also a secondary spherical structure formed by the primary particles.

(3) Physical Property Measurement

The present inventors tested the median particle diameter $D_{50}$, tap density and specific surface area of the Lithium-

TABLE 2

| Examples | Chemical formula of substrate |
|---|---|
| Example 1 | $Li_{1.2}[(Mn_{0.667}Co_{0.167}Ni_{0.167})_{0.8}]O_2$ |
| Example 2 | $Li_{1.25}[(Mn_{0.75}Co_{0.25})_{0.75}]O_2$ |
| Example 3 | $Li_{1.5}[(Mn_{0.5909}Co_{0.0909}Ni_{0.2273}Al_{0.0909})_{0.475}Ti_{0.025}]O_2$ |
| Example 4 | $Li[(Mn_{0.6536}Ni_{0.3268}Sr_{0.0196})_{0.97}Zr_{0.02}Nb_{0.01}]O_2$ |
| Example 5 | $Li_{1.3}(Mn_{0.6349}Co_{0.1587}Ni_{0.1587}Mg_{0.0477})_{0.686}La_{0.007}W_{0.007}]O_2$ |
| Example 6 | $Li_{1.2}(Mn_{0.6349}Co_{0.1587}Ni_{0.1587}Cr_{0.0477})_{0.796}Pr_{0.004}]O_2$ |
| Example 7 | $Li_{1.3}(Mn_{0.6536}Co_{0.1634}Ni_{0.1634}Zn_{0.0196})_{0.693}Sc_{0.007}]O_2$ |
| Comparative Example 1 | $Li_{1.2}[(Mn_{0.667}Co_{0.167}Ni_{0.167})_{0.8}]O_2$ |
| Comparative Example 2 | \ |
| Comparative Example 3 | $Li_{1.2}[(Mn_{0.667}Co_{0.167}Ni_{0.167})_{0.8}]O_2$ |
| Comparative Example 4 | $Li_{1.2}[(Mn_{0.667}Co_{0.167}Ni_{0.167})_{0.8}]O_2$ |
| Comparative Example 5 | $Li_{1.2}[(Mn_{0.667}Co_{0.167}Ni_{0.167})_{0.8}]O_2$ |

| Examples | Chemical formula of coating layer | Thickness of coating layer (nm) |
|---|---|---|
| Example 1 | $Na_{0.833}[Li_{0.25}(Mn_{0.667}Co_{0.167}Ni_{0.167})_{0.75}]O_2$ | 42 |
| Example 2 | $Na_{0.4}[Li_{0.167}(Mn_{0.625}Co_{0.208})]O_2$ | 11 |
| Example 3 | $Na_{0.833}[Li_{0.5}(Mn_{0.5909}Co_{0.0909}Ni_{0.2273}Al_{0.0909})_{0.475}Ti_{0.025}]O_2$ | 100 |
| Example 4 | $Na_{0.667}[Li_{0.1667}(Mn_{0.6536}Ni_{0.3268}Sr_{0.0196})_{0.8083}Zr_{0.0167}Nb_{0.0083}]O_2$ | 83 |
| Example 5 | $Na_{0.667}[Li_{0.25}(Mn_{0.6349}Co_{0.1587}Ni_{0.1587}Mg_{0.0477})_{0.735}La_{0.0075}W_{0.0075}]O_2$ | 57 |
| Example 6 | $Na_{0.667}[Li_{0.25}(Mn_{0.6349}Co_{0.1587}Ni_{0.1587}Cr_{0.0477})_{0.7462}Pr_{0.0038}]O_2$ | 78 |
| Example 7 | $Na_{0.4}[Li_{0.167}(Mn_{0.6536}Co_{0.1634}Ni_{0.1634}Zn_{0.0196})_{0.825}Sc_{0.0083}]O_2$ | 31 |
| Comparative Example 1 | \ | \ |
| Comparative Example 2 | $Na_{0.833}[Li_{0.25}(Mn_{0.667}Co_{0.167}Ni_{0.167})_{0.75}]O_2$ | \ |
| Comparative Example 3 | $Na_{0.833}[Li_{0.25}(Mn_{0.667}Co_{0.167}Ni_{0.167})_{0.75}]O_2$ | 185 |
| Comparative Example 4 | $Na_{0.833}[Li_{0.25}(Mn_{0.667}Co_{0.167}Ni_{0.167})_{0.75}]O_2$ | 370 |
| Comparative Example 5 | $Na_{0.4}[Li_{0.75}(Mn_{0.667}Co_{0.167}Ni_{0.167})_{0.25}]O_2$ | 50 |

Manganese-rich materials prepared in the above-mentioned Example, the specific results were shown in Table 3.

TABLE 3

| Examples | Median particle diameter $D_{50}$/μm | Tap density/ g/cm$^3$ | Specific surface area/m$^2$/g |
|---|---|---|---|
| Example 1 | 11.9 | 1.80 | 6.3 |
| Example 2 | 10.5 | 1.88 | 0.3 |
| Example 3 | 16.3 | 1.85 | 4.8 |
| Example 4 | 6.8 | 1.75 | 0.6 |
| Example 5 | 9.6 | 1.82 | 4.1 |
| Example 6 | 14.0 | 1.87 | 2.4 |
| Example 7 | 6.2 | 2.0 | 1.1 |
| Comparative Example 1 | 10.1 | 1.70 | 7.7 |
| Comparative Example 2 | 11.2 | 1.68 | 6.5 |
| Comparative Example 3 | 12.0 | 1.75 | 6.5 |
| Comparative Example 4 | 12.2 | 1.65 | 5.1 |
| Comparative Example 5 | 12.0 | 1.78 | 5.8 |

As can be seen from the results in Table 3, the Lithium-Manganese-rich material provided by the present disclosure had higher tap density and lower specific surface area compared with its substrate material and the coating layer material.

(4) Electrochemical Performance Test

The present disclosure tested the electrochemical properties of the materials prepared by the above-mentioned Examples, including a first charge-discharge specific capacity, an initial coulombic efficiency, a cycle stability, a rate capability and a voltage drop, the specific test results were shown in Table 4.

TABLE 4

| Examples | First 0.1 C discharge specific capacity (mAh/g) | Initial coulombic efficiency (%) | 1 C/ discharge specific capacity (mAh/g) | Capacity retention rate after circulation for 100 cycles (%) | Average voltage decay (mV) |
|---|---|---|---|---|---|
| Example 1 | 295 | 94 | 257 | 92.0 | 180 |
| Example 2 | 275 | 92 | 248 | 90.0 | 186 |
| Example 3 | 283 | 91 | 249 | 93.1 | 162 |
| Example 4 | 288 | 86 | 248 | 85.4 | 155 |
| Example 5 | 281 | 94 | 233 | 93.5 | 160 |
| Example 6 | 284 | 90 | 244 | 90.1 | 172 |
| Example 7 | 267 | 88 | 246 | 88.6 | 166 |
| Comparative Example 1 | 253 | 86 | 218 | 68.0 | 320 |
| Comparative Example 2 | 0.4 | 0 | 0 | 0 | \ |
| Comparative Example 3 | 220 | 79 | 185 | 88.3 | 200 |
| Comparative Example 4 | 245 | 82 | 210 | 73.2 | 230 |
| Comparative Example 5 | 251 | 84 | 211 | 82.2 | 208 |

Note:
"\" in Table 4 indicated that the average voltage drop of Comparative Example 2 was untestable or meaningless for testing.

As can be seen from the comparison results of Example 1 and Comparative Example 1, compared with the substrate material prepared in Comparative Example 1, the Lithium-Manganese-rich substrate material provided by the present disclosure has the advantages that the discharge specific capacity at 0.1 C is increased by 42 mAh/g, the initial coulombic efficiency is increased by 8%, the discharge specific capacity at 1 C is increased by 39 mAh/g, the capacity retention rate after 100 charge-discharge cycles is increased by 24%, and the average voltage decay is reduced by 140 mV, thus the performance of the substrate material is obviously improved by the Lithium-Manganese-rich material provided by the present disclosure.

As can be seen from the comparison results of Example 1 and Comparative Example 2, the capacity of the coating material provided by the present disclosure is very low (approximately zero), but the Lithium-Manganese-rich material provided by the present disclosure not only has excellent rate capability and cycle stability, but also exhibits excellent capacity performance.

As can be seen from the comparison results of Example 1 and Comparative Example 3, compared with the substrate material prepared in Comparative Example 3, the Lithium-Manganese-rich substrate material provided by the present disclosure has the advantages that the discharge specific capacity at 0.1 C is increased by 75 mAh/g, the initial coulombic efficiency is increased by 15%, the discharge specific capacity at 1 C is increased by 72 mAh/g, the capacity retention rate after 100 charge-discharge cycles is increased by 3.7%, and the average voltage decay is reduced by 20 mV. Therefore, when it is particularly required to control the thickness of the coating layer to be 10-100 nm, the Lithium-Manganese-rich material has excellent discharge specific capacity, rate capability and cycle stability.

As can be seen from the comparison results of Example 1 and Comparative Example 4, compared with the substrate material prepared in Comparative Example 4, the Lithium-Manganese-rich substrate material provided by the present disclosure has the advantages that the discharge specific capacity at 0.1 C is increased by 50 mAh/g, the initial coulombic efficiency is increased by 12%, the discharge specific capacity at 1 C is increased by 47 mAh/g, the capacity retention rate after 100 charge-discharge cycles is increased by 18.8%, and the average voltage decay is reduced by 50 mV. Therefore, the Lithium-Manganese-rich material produced with the method for preparing the Lithium-Manganese-rich material provided by the present disclosure has more excellent cycle stability and higher discharge specific capacity.

As can be seen from the comparison results of Example 1 and Comparative Example 5, compared with the substrate material prepared in Comparative Example 5, the Lithium-Manganese-rich substrate material provided by the present disclosure has the advantages that the discharge specific capacity at 0.1 C is increased by 44 mAh/g, the initial coulombic efficiency is increased by 10%, the discharge specific capacity at 1 C is increased by 46 mAh/g, the capacity retention rate after 100 charge-discharge cycles is increased by 9.8%, and the average voltage decay is reduced by 28 mV. Therefore, the Lithium-Manganese-rich material produced with the method for preparing the Lithium-Manganese-rich material provided by the present disclosure has more excellent cycle stability and higher discharge specific capacity.

Figure 5:
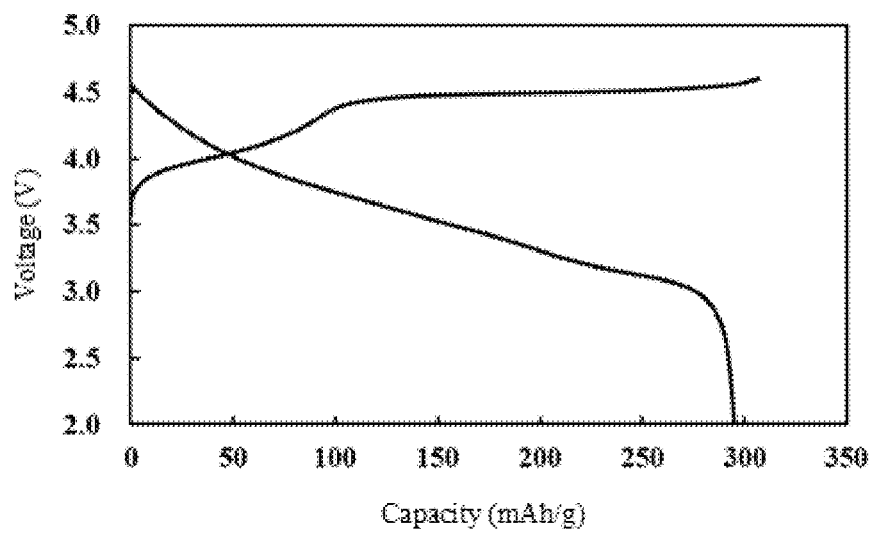
FIG. 5 illustrates a first charge-discharge curve of the Lithium-Manganese-rich material prepared in Example 1.

The present disclosure exemplarily provides a test result chart illustrating a first charge-discharge curve of the Lithium-Manganese-rich material prepared in Example 1, as shown in FIG. 5, the discharge specific capacity at 0.1 C of the Lithium-Manganese-rich material provided by the present disclosure can reach 295 mAh/g, and the initial coulombic efficiency reaches 94%.

Figure 6:
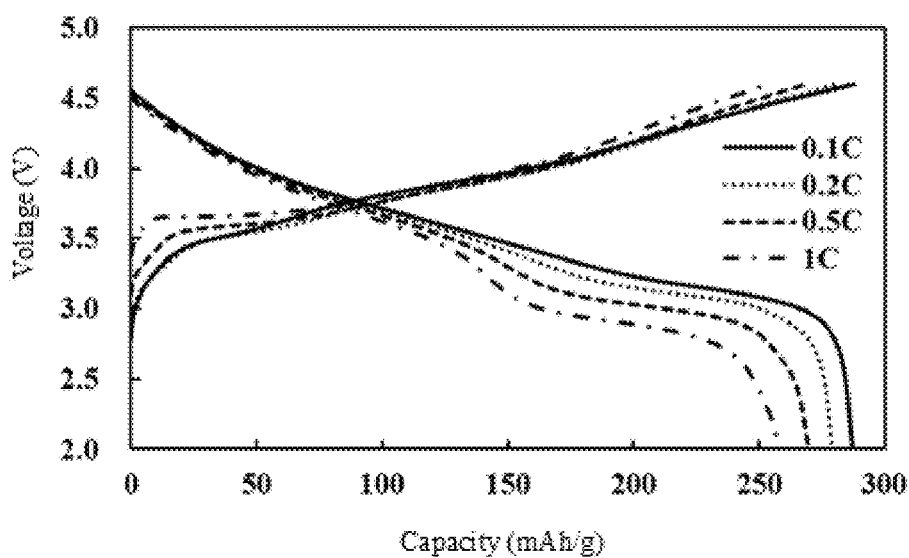
FIG. 6 illustrates a graph showing rate capability test results of a Lithium-Manganese-rich material prepared in Example 1.

The present disclosure exemplarily provides a test result chart illustrating the rate capability test of the Lithium-Manganese-rich material prepared in Example 1, as shown in FIG. 6, the Lithium-Manganese-rich material provided by the present disclosure has excellent rate capability.

Figure 7:
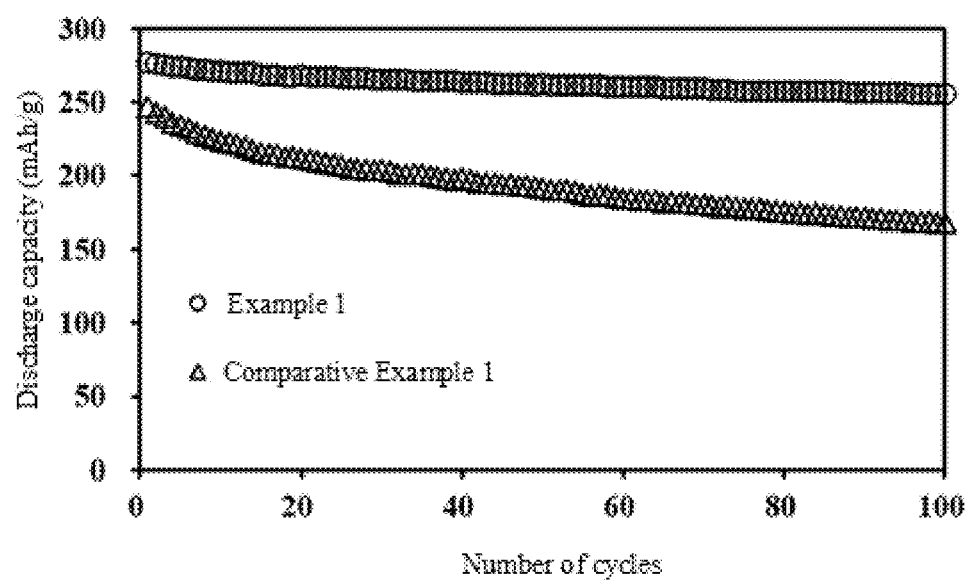
FIG. 7 illustrates a graph showing cycle stability tests results of the materials obtained in Example 1 and Comparative example 1.

The present disclosure exemplarily provides the cycle stability of the materials prepared in Example 1 and Comparative Example 1, as shown in FIG. 7, the Lithium-Manganese-rich material provided by the present disclosure exhibits excellent cycle stability.

The results show that the Lithium-Manganese-rich material provided by the present disclosure has excellent charge-discharge specific capacity, high performance of the initial coulombic efficiency, excellent rate capability and cycle stability. Particularly, the discharge specific capacity of the coating layer material is extremely low (approximately zero), but the Lithium-Manganese-rich material provided by the present disclosure not only has excellent rate capability and cycle stability, but also exhibits excellent discharge specific capacity, the comprehensive performance of the Lithium-Manganese-rich material is remarkably improved compared with the individual substrate material and coating layer material.

The above content describes in detail the preferred embodiments of the present disclosure, but the present disclosure is not limited thereto. A variety of simple modifications can be made in regard to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A Lithium-Manganese-rich material comprising a substrate and a coating layer coated on a surface of the substrate;
    the substrate comprises a substance represented by a chemical formula $Li_{1.2+x}[(Mn_aCo_bNi_cM_{1-a-b-c})_{1-d}M'_d]_{0.8-x}O_2$, the coating layer comprises a substance represented by a chemical formula $Na_u[Li_v(Mn_aCo_bNi_cM_{1-a-b-c})_yM'_{1-v-y}]O_2$, wherein $0 \le x \le 0.3$, $0.5 \le a \le 1$, $0 \le b \le 0.5$, $0 \le c \le 0.5$, $0 \le d \le 0.1$, $0.4 \le u < 5/6$, $0.167 \le v \le 0.5$, $0.5 \le y \le 1$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;
    the value of a in the substrate equals the value of a in the coating layer; the value of b in the substrate equals the value of b in the coating layer; and the value of c in the substrate equals the value of c in the coating layer; and the coating layer in the Lithium-Manganese-rich material has a thickness of 10-100 nm.

2. The Lithium-Manganese-rich material of claim 1, wherein the Lithium-Manganese-rich material has a median particle diameter D50 of 5-15 μm.

3. A method of preparing the Lithium-Manganese-rich material of claim 1 comprising the following steps:
    sintering a lithium-manganese-rich precursor material and ingredients in a component A to obtain a Lithium-Manganese-rich material, wherein the component A comprises a lithium salt and a sodium salt, and further comprises a first dopant containing an element M';
    the lithium-manganese-rich precursor material is at least one substance selected from the substances represented by the chemical formulas $Mn_aCo_bNi_cM_{1-a-b-c}(OH)_2$ and $Mn_aCo_bNi_cM_{1-a-b-c}CO_3$;
    wherein $0.5 \le a \le 1$, $0 \le b \le 0.5$, $0 \le c \le 0.5$, M and M' are respectively and independently at least one element selected from the group consisting of Al, B, Ba, Ce, Cr, Cu, Fe, K, La, Mg, Mo, Na, Nb, Os, Pr, Re, Ru, Sc, Sr, Sm, Ta, Ti, V, W, Y, Yb, Zn and Zr;
    and
    a molar ratio of the used amount of the first dopant to the sum of the used amounts of the lithium-manganese-rich precursor material and the first dopant is 0-0.1:1; a molar ratio of the used amount of the lithium salt to the sum of the used amounts of the lithium-manganese-rich precursor material and the first dopant is 1.0-1.6:1, a molar ratio of the used amount of the sodium salt to the used amount of the lithium salt is 0.005-0.3:1; the used amount of the first dopant is calculated in terms of M' element contained therein, the used amounts of the lithium-manganese-rich precursor material is calculated in terms of a sum of Mn, Co, Ni, M element contained therein, the used amount of the lithium salt is calculated in terms of Li element contained therein, and the used amount of the sodium salt is calculated in terms of Na element contained therein.

4. The method of claim 3, wherein sintering conditions comprise: the sintering is performed in an oxygen-containing atmosphere or a nitrogen atmosphere, the temperature is raised from room temperature to 300-600° C., heat preservation is performed for 0-6h to carry out a first sintering, the temperature is subsequently further raised to 650-1,000° C., heat preservation is performed for 4-20h to carry out a second sintering.

5. The method of claim 3, wherein the lithium salt is at least one selected from the group consisting of lithium carbonate, lithium hydroxide, lithium chloride, lithium nitrate and lithium sulfate.

6. The method of claim 3, wherein the method further comprises preparing the lithium-manganese-rich precursor material with the following steps:
    subjecting the ingredients in a component B to a coprecipitation reaction in the presence of a solvent, so as to obtain the lithium-manganese-rich precursor material, wherein the component B comprises a manganese salt, a precipitant and a complexing agent, and further comprises at least one of a nickel salt, a cobalt salt and a second dopant, wherein the second dopant includes an element M.

7. The method of claim 6, wherein the precipitant is at least one selected from the group consisting of sodium hydroxide, potassium hydroxide, sodium carbonate and potassium carbonate.

8. The method of claim 6, wherein the coprecipitation reaction conditions comprise: the reaction is carried out in a reaction kettle at the temperature of 20-60° C., a pH value of 7-12, a stirring rotation speed of 300-1,000 rpm for the reaction time of 10-30 h.

9. A use of the Lithium-Manganese-rich material of claim 1 in a lithium ion battery.

10. The Lithium-Manganese-rich material of claim 1, wherein a specific surface area of the Lithium-Manganese-rich material is 0.2-8 $m^2/g$, and a tap density of the Lithium-Manganese-rich material is 1.4-2.0 $g/cm^3$.

11. The method of claim 3, wherein the sodium salt is at least one selected from the group consisting of sodium carbonate, sodium bicarbonate, sodium oxalate, sodium acetate, sodium citrate, sodium chloride, sodium nitrate, sodium sulfate and sodium hydroxide.

12. The method of claim 3, wherein the first dopant is at least one selected from the group consisting of an oxide containing the element M', a phosphate containing the element M', a fluoride containing the element M' and a carbonate containing the element M'.

13. The method of claim 6, wherein the complexing agent is at least one selected from the group consisting of ammonia water, salicylic acid, ammonium sulfate and ammonium chloride.

14. The method of claim 6, wherein the second dopant is at least one selected from the group consisting of an oxide containing the element M, a phosphate containing the element M, a fluoride containing the element M and a carbonate containing the element M.

* * * * *